(No Model.)

C. HALSTEAD.
COFFEE URN.

No. 346,278. Patented July 27, 1886.

WITNESSES:
A. P. Grant
W. F. Kircher

INVENTOR:
C. Halstead,
by Henry E. Roeder,
ATTORNEY.

UNITED STATES PATENT OFFICE.

CHARLES HALSTEAD, OF NEW YORK, N. Y.

COFFEE-URN.

SPECIFICATION forming part of Letters Patent No. 346,278, dated July 27, 1886.

Application filed September 21, 1883. Serial No. 106,994. (No model.)

*To all whom it may concern:*

Be it known that I, CHARLES HALSTEAD, a citizen of the United States, residing at New York, in the State of New York, have invented new and useful Improvements in Coffee-Urns, of which the following is a specification.

My invention consists in constructing a coffee-urn with an exterior metallic vessel having within the same an earthen vessel provided with a metallic casing, the said earthen and metallic vessel having between them a lining of plaster, substantially as hereinafter described; and, further, of a sack or filter, which is connected by certain new and novel means with a holder in a secure and reliable manner, and the expanding-ring and fastening-hoop thereof are covered by the fabric of the sack, so as to be removed from contact with the coffee or tea.

Figure 1:
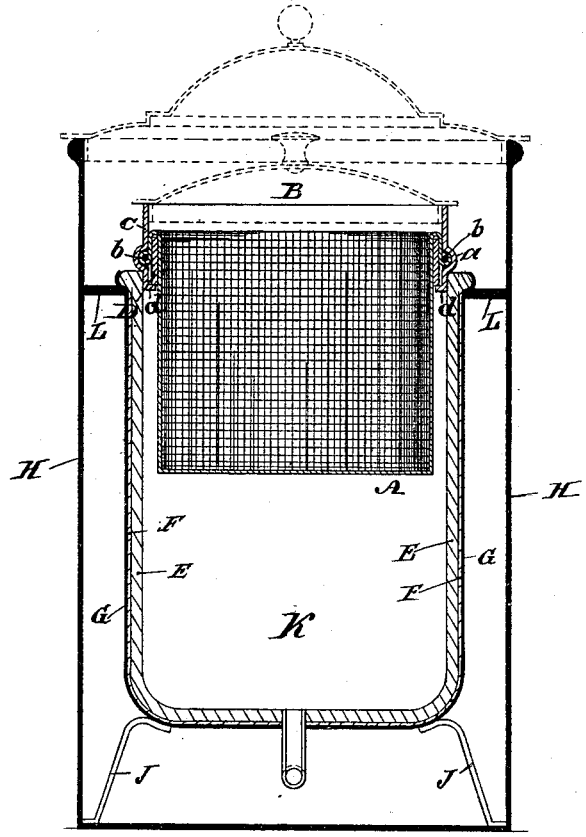
Figure 2:
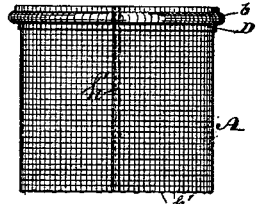
Figure 3:
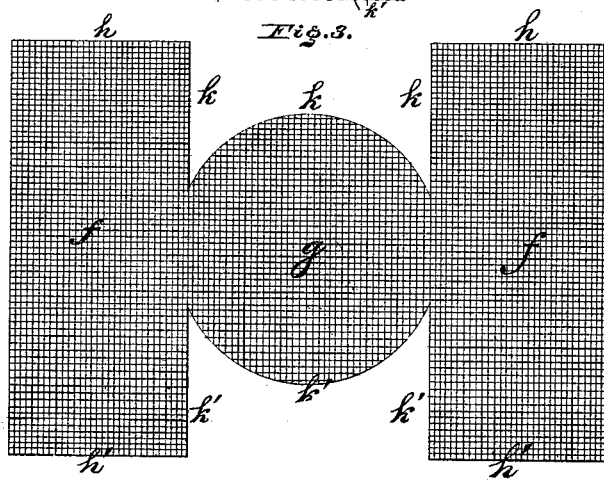

In the accompanying drawings, Figure 1 represents a vertical section of a coffee-urn embodying my invention. Fig. 2 is a side elevation of the sack or filter on a reduced scale. Fig. 3 is a view of the blank from which the sack is made.

Similar letters of reference indicate corresponding parts in the several figures.

H represents the outer case or urn, and K the inner chamber or coffee or tea pot supported on an internal ledge, L, attached to the case H, or by suitable legs or supports, J J, or both, if desired. The space between the inner chamber, K, and the outer case, H, is filled with hot water or steam to keep the contents of the inner chamber hot as long as possible. The inner chamber, K, is made of earthenware E, made of fine clay and minerals, such as quartz or flint, or feldspar or the equivalent, and with a grit or glass glaze, inclosed in a metallic casing, G, and secured therein by a solution of calcine plaster, F, or its equivalent, to secure it firmly to the casing. This construction of the chamber K makes a strong vessel, not liable to break or be easily damaged, and prevents the coffee or tea coming in contact with metallic surfaces likely to produce a foreign flavor in the same.

A represents the sack or filter, and B the holder thereof. The former is constructed of fabric, and the latter of a cylindrical band, C, of metal, having a circumferential bead, a, which leaves on the inner face of the band a groove to receive the expanding-ring b at the top of the sack or filter A, said bead a forming the support of the holder on the inner vessel, K, of a coffee or tea urn or on the top of a coffee or tea pot.

In order to retain the ring b in the groove of the band C, I employ a hoop, D, which is applied as follows: The sack is pulled upwardly through the band C without displacing the ring b. The hoop D is forced or sprung into position from below against the ring b, and the sack is then returned downwardly through the band C, whereby it folds over the top of the hoop D and covers the inner face of the same.

In order to retain the hoop D in position the lower end of the band C is turned or bent, forming an inwardly-projecting flange, d, on which said hoop is rested, wherefore as the hoop is prevented from dropping from the band, owing to the flange d, and the ring is prevented from leaving the groove of the band, owing to the controlling action of the hoop, it is evident that the sack A and holder B are reliably connected, and the sack is prevented from separation and dropping from the holder.

In Fig. 3 is shown a blank from which to make a sack or filter. I take a rectangular piece of suitable fabric and cut the opposite sides thereof, so as to leave at each end a rectangular piece, f, and at the center a disk-shaped piece, g, which connects the end pieces. The end pieces are then turned upright and shaped around the curved edge of the center piece, g, after which I sew together, respectively, the edges h and h, h' and h', k, k, and k, and k, k' and k', thus forming the bottom and side of the sack or filter, after which I secure the top ring in position, the result being a strong, durable, inexpensive, and attractive sack, the bottom whereof is well adapted to endure the strain to which it is subjected.

I am aware that it is not new to form a coffee-urn of an exterior metallic chamber, and an earthenware vessel having a tightly-fitting casing of metal; but in such urn there is no filling of plaster between the casing and vessel, as in my invention. As hereinbefore stated, earthenware chambers or vessels are often irregular in shape. This makes no difference on the interior of a chamber; but this is not the case with the exterior, for this may be pressed unequally by the outer casing, causing fracture or breakage of the chamber, especially when the urn is hot; consequently the exterior casing is made slightly larger than usual, to provide for any irregularity of the earthenware chamber, and also produce a space between the casing, which, being occupied by plaster, makes a uniform packing or filling around the exterior of said chamber. Furthermore, the filling prevents any possible shifting of the inner chamber, and also by its nature acts as a non-conductor, preventing loss of heat, all of which are important features in articles of the class.

What I claim is—

1. In a coffee or tea urn, an exterior metallic vessel, H, in combination with a central earthenware chamber, E, a metallic casing, G, surrounding said chamber, and a solution of calcined plaster, F, or its equivalent, filling the space between the chamber E and casing G, and securing said chamber to said casing, substantially as described.

2. A coffee or tea pot sack or filter connected with the holder thereof by means of a hoop, D, which forces the ring $b$ of the sack into a groove on the inner face of the band of the holder, substantially as and for the purpose set forth.

3. A holder for the sack or filter of a coffee or tea pot, having a band formed with a groove and a flange, and a hoop supported on said flange, in combination with the sack having a ring which enters the groove of said band and is controlled by said hoop, substantially as and for the purpose set forth.

CHARLES HALSTEAD.

Witnesses:
 HENRY E. ROEDER,
 J. GEMMEL, Jr.